United States Patent [19]

Leitman et al.

[11] Patent Number: 5,397,066
[45] Date of Patent: Mar. 14, 1995

[54] SEPARATION OF PLASTIC MATERIALS

[75] Inventors: Richard H. Leitman, East Brunswick, N.J.; Jerry A. Pickering, Storrs, Conn.; Lukasz E. Rychlicki, Cazzago Brabbia, Italy

[73] Assignee: Mobil Oil Corporation, Fairfax, Va.

[21] Appl. No.: 7,901

[22] Filed: Jan. 22, 1993

[51] Int. Cl.$^6$ .................... B03B 1/00; B03C 7/02; B07B 15/00
[52] U.S. Cl. ........................ 241/19; 241/24; 241/DIG. 38; 209/4; 209/9; 209/127.1; 209/128; 209/129; 209/138
[58] Field of Search ............ 209/12, 127.1, 127.2, 209/127.3, 128, 129, 138, 139.1, 140, 141, 4, 9; 241/16, 19, 20, 24, DIG. 38

[56] References Cited

U.S. PATENT DOCUMENTS

| | | |
|---|---|---|
| 2,683,685 | 7/1954 | Matheson . |
| 3,322,275 | 5/1967 | Breakiron et al. ............ 209/127 |
| 3,370,703 | 2/1968 | Carpenter ................. 209/127 |
| 3,401,795 | 9/1968 | Tauveron . |
| 3,402,814 | 9/1968 | Morel . |
| 3,550,773 | 12/1970 | Villani . |
| 3,823,820 | 7/1974 | Sosson ..................... 209/44 |
| 3,917,567 | 11/1975 | Barrett . |
| 3,941,684 | 3/1976 | Bradbury et al. ............ 209/3 |
| 4,071,304 | 1/1978 | Chauvin et al. ............ 427/185 |
| 4,127,476 | 11/1978 | Iannazzi . |
| 4,159,941 | 7/1979 | Avery . |
| 4,160,722 | 7/1979 | Marsh . |
| 4,299,693 | 11/1981 | Paulson . |
| 4,314,899 | 2/1982 | Styring . |
| 4,317,714 | 3/1982 | Forslund .................. 209/44 |
| 4,374,727 | 2/1983 | Takahashi . |
| 4,379,748 | 4/1983 | Hoogendoorn . |
| 4,570,861 | 2/1986 | Zentgraf et al. ............ 241/24 |
| 4,617,111 | 10/1986 | Grimm et al. ............... 209/4 |
| 4,746,073 | 5/1988 | Stone . |
| 4,857,173 | 8/1989 | Belk . |
| 4,865,721 | 9/1989 | Smith et al. .............. 209/135 |
| 4,895,642 | 1/1990 | Frei ..................... 209/127.3 |
| 5,118,407 | 5/1992 | Beck et al. ................ 209/2 |
| 5,152,604 | 10/1992 | Paul . |
| 5,251,762 | 10/1993 | Taylor . |

FOREIGN PATENT DOCUMENTS

| | | |
|---|---|---|
| 68502 | 1/1983 | European Pat. Off. . |
| 3040996 | 6/1982 | Germany . |
| 30971 | 3/1977 | Japan . |
| 52-56174 | 5/1977 | Japan . |
| 697194 | 11/1979 | U.S.S.R. . |
| 940873 | 7/1982 | U.S.S.R. . |
| 797115 | 3/1986 | U.S.S.R. . |
| 1217494 | 3/1986 | U.S.S.R. . |
| 1526845 | 12/1989 | U.S.S.R. . |
| 1606196 | 11/1990 | U.S.S.R. . |

OTHER PUBLICATIONS

Chemical Engineering, Sep. 1992, p. 3.

*Primary Examiner*—Thomas M. Lithgow
*Attorney, Agent, or Firm*—Alexander J. McKillop; Malcolm D. Keen; Marina V. Schneller

[57] ABSTRACT

Separation of a mixture of plastic materials by separating the plastic mixture according to particle size, and introducing plastic of similar size particles into a vertical fluidized bed column having an upwardly flowing gaseous stream therein. The flow rate of the gaseous stream is controlled to provide a relatively low density fraction of the plastic mixture exiting at the upper end of the column, and a relatively high density fraction of the plastic mixture exiting at the lower end of the column. In one embodiment, electrostatic charges are induced on the particles of the plastic mixture prior to introducing the plastic of similar size particles into the column, and the column is charged to attract thereto the plastic particles having the highest electrostatic charge.

13 Claims, 1 Drawing Sheet

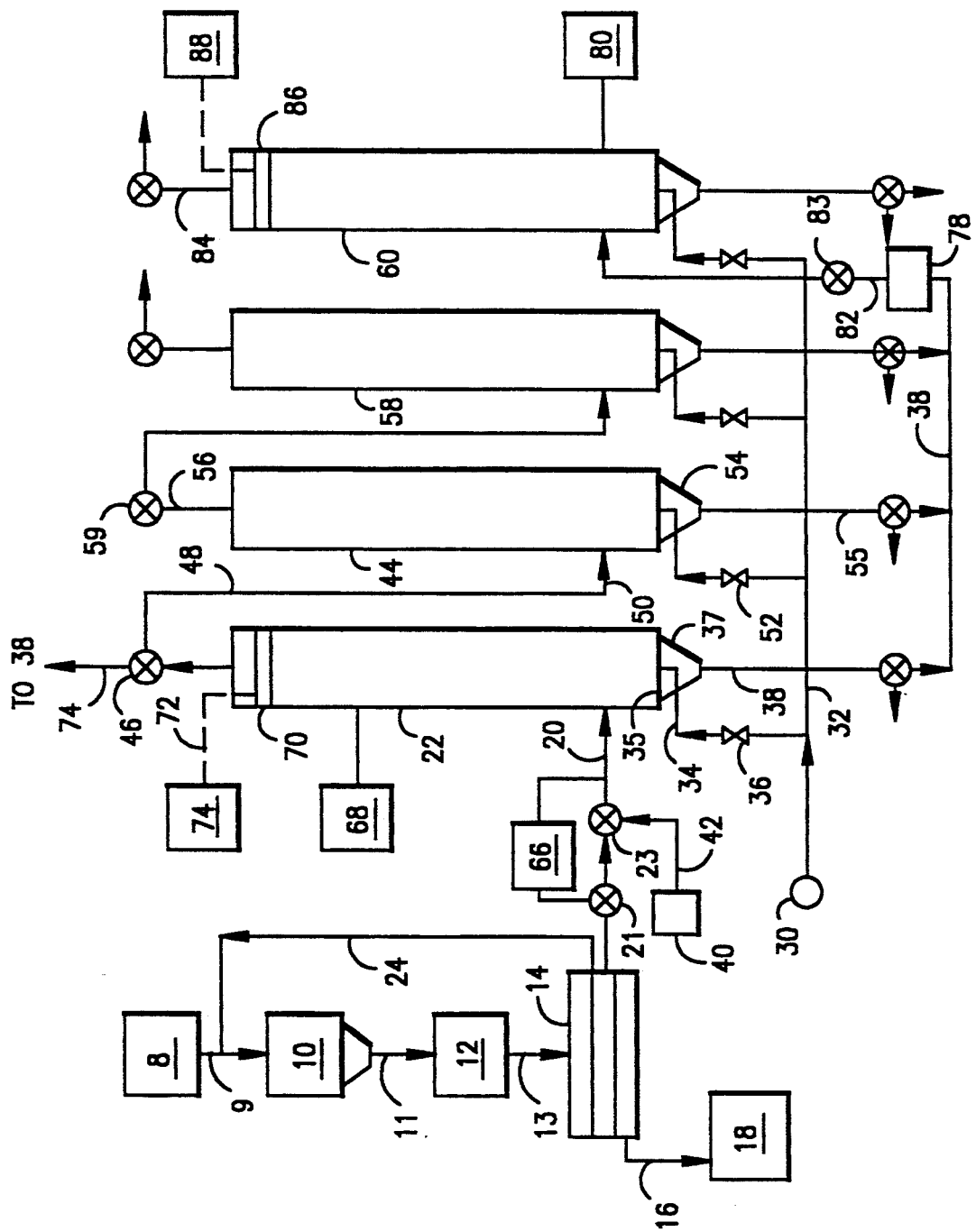

SEPARATION OF PLASTIC MATERIALS

BACKGROUND OF THE INVENTION

1. Field of the Invention

The present invention relates to a method and a system for sorting particles of different plastic materials. More particularly, the present invention relates to a method and a system for separating and sorting plastic materials by particle size and density, as well as with selective electrostatic charges.

2. Description of Prior Art

Disposal of solid waste is an increasing problem that has reached crisis levels in some parts of the country. An obvious solution is to recycle materials that normally are landfilled. With a commercially viable separation process, a category of readily recyclable material would be waste plastics. Further, other industries, e.g. wire & cable and automotive, have a number of materials that would have value if they were reclaimable. A major obstacle to the reclamation of these materials is the presence of commingled plastic materials which are extremely difficult to separate into discrete components.

It is very difficult to cost effectively recycle commingled plastics because failure to separate the plastics completely may substantially reduce the properties of one or more of the plastic material. For example, PET and PVC materials are not compatible. PET melts at about 500° F. while PVC will thermally degrade at approximately 400° F. Upon degrading, PVC gives off hydrochloric acid due to dehydrochlorination which destroys desirable properties of the PET material. Specifically, discoloration, voids, and black specs may be found in the PET product as a result of the PVC which will downgrade the quality of the recycled product. Further, the evolving HCl may be harmful to personnel, and can cause corrosive wear of extrusion or other equipment.

In the plastic packaging industry, typical rigid household plastic packages, such as bottles and other containers, are primarily made of polyvinylchloride (PVC), polyethylene terephthalate (PET), polystyrene (PS), polypropylene (PP), and polyethylene (PE), including high density polyethylene (HDPE) and low density polyethylene (LDPE).

Plastics used in packaging containers are currently labeled with a recycle triangular logo formed by three arrows aligned head-to-tail and having a number within the triangle identifying the plastic in accordance with the following Table.

TABLE

| No | Plastic |
|---|---|
| 1 | PET (PETE) |
| 2 | HDPE |
| 3 | PVC |
| 4 | LDPE |
| 5 | PP |
| 6 | PS |
| 7 | Other (co-extruded, mixed plastics, etc.) |

Thus, plastic bottles, for example, are manually separable by the user and/or the collector. However, waste plastic packaging materials generally are commingled during collection, and the bottles and containers are either compacted or comminuted for space conservation. The primary known separation methods are water flotation or hydrocyclone processes based on density differences. These wet methods are expensive and time consuming due to costly drying. Further, water is of particular concern when the plastic is destined for extrusion pelletization.

The water flotation process generally is a float/sink operation where the lighter fractions, (e.g. PE and PP) float on the water and are culled off while the heavier fractions (e.g. PVC, PET and PS) sink. The density ranges of these materials are very close and may overlap. For example, typical PVC densities range from 1.25 to 1.36 g/cc while PET densities range from 1.32 to 1.39 g/cc.

With this overlap in densities, obtaining a satisfactory separation of PVC and PET with the water floatation method will be very difficult. Further, the water flotation process requires a relatively high amount of energy and water utilization, as well as a need to purify the water effluent. It should be noted that the use of hydrocyclones can shift the density where separation occurs so that PS can generally be recovered with the PE and PP fractions.

SUMMARY OF THE INVENTION

In accordance with a broad aspect of the present invention, there is provided a method of separating a mixture of plastic materials comprising the steps of separating the plastic mixture according to particle size, and introducing plastic of similar size particles into a vertical fluidized bed column having an upwardly flowing gaseous stream therein. The flow rate of the stream is controlled to provide a relatively low density fraction of the plastic mixture exiting at the upper end of the column, and a relatively high density fraction of the plastic mixture exiting at the lower end of the column.

In accordance with a specific aspect of the invention, there is provided the further step of comminuting the plastic mixture into particles having a size equal to or less than 1.0 inch, and preferably less than 0.3 inch prior to introducing similar size plastic particles into the fluidized bed column.

In accordance with another specific aspect of the present invention, the low density fraction is typically equal to or less than about 1.1 g/cc, and the high density fraction is typically greater than about 1.1 g/cc. In accordance with still another specific aspect of the invention, the low density fraction includes at least one of high density polyethylene, low density polyethylene, polypropylene and polystyrene; and the high density fraction includes at least one of polyvinylchloride and polyethylene terephthalate.

In accordance with yet another specific aspect of the present invention, there is provided the further steps of inducing electrostatic charges on the particles of the plastic mixture prior to introducing similar size plastic particles into the vertical fluidized bed column, and charging the column for attracting plastic particles having the higher electrostatic charge and a polarity opposite to that of the column.

In accordance with another broad aspect of the present invention, there is provided a system for separating a mixture of plastic materials comprising means for separating the plastic mixture according to particle size, a vertical fluidized bed column, and means for providing an upwardly flowing gaseous stream in the column. The system also includes means for feeding plastic of similar size particles into the column, and means for controlling the flow rate of the stream to provide a relatively low density fraction of the plastic mixture exiting at the upper end of the column and a relatively high density fraction of the plastic mixture exiting at the lower end of the column.

In accordance with another specific aspect of the present invention, the system also comprises means upstream of the feeding means for comminuting the plastic mixture into particles having a size equal to or less than 1.0 inch, and preferable less than 0.3 inch. As used herein, comminuting is a generic term for size reduction. The term includes grinding, cutting, dicing, crushing and the like.

In accordance with yet another specific aspect of the present invention, the system also includes means upstream of the feeding means for inducing electrostatic charges on the particles in the plastic mixture, and means for charging the column to attract the plastic particles having the higher opposite polarity electrostatic charge.

There are several advantages for this process. The process does not include wetting and drying of the material and is therefore much less expensive than flotation. Also, there is no waste water to be concerned with, and no hazardous by-products in the waste water.

BRIEF DESCRIPTION OF THE DRAWING

The FIGURE is a schematic drawing of embodiments of the present invention showing a system for separating and sorting plastic materials by particle size and density, as well as selective electrostatic charges.

DESCRIPTION OF SPECIFIC EMBODIMENTS

With reference to the FIGURE, there is shown a flow diagram of a system for separating a mixture of plastic materials wherein the mixture is fed from a hopper or other storage means 8 by a line 9 to a granulator or grinder 10 for comminuting the plastic mixture into particles, preferably having a particle size equal to or less than 1.0 inch and preferably less than 0.3 inch. The ground plastic particles are then supplied by a line 11 to a storage container 12. From the storage container 12, the ground plastic is passed by a line 13 to a filter screen apparatus 14 which provides vibratory motion to the mixed plastic particles. From the lower level of the screen apparatus 14, dust-like particles are separated and sent by line 16 to a waste storage container 18 for further processing or other treatment. The intermediate level of the screen apparatus 14 separates out particles of less than 1.0 inch, and preferably from about 0.2 inch to about 0.3 inch, which are sent by a line 20 through valves 21 and 23 to the input end of a vertical fluidized bed 22.

The output from the upper level of the screen apparatus 14 is recycled by a line 24 back to the input feed line 9 of the granulator or grinder 10. In a preferred embodiment, this recycle line 24 will contain particles of greater than 0.3 inch.

Means including a gas source 30 sends a gas stream, e.g. air, by lines 32,34 to a diffuser plate 35 in the lower input end of the column 22 for providing an upwardly flowing gaseous stream in the column 22. A valve 36 is located in the line 34 to control or adjust the flow rate of the gas stream such that a desired relatively low density fraction of the plastic mixture fed to the column by the line 20 exits at the upper end of the column 22, and a relatively high density fraction of the plastic mixture exits at the lower end of the column 22. The high density fraction of the plastic mixture exits the column 22 through a funnel-like structure 37 at the lower end thereof, and is fed or removed by a line 38 for further separation or for other recycle operation.

In a preferred embodiment of the present invention, the high density fraction is greater than 1.1 g/cc such that it includes at least one of polyvinylchloride and polyethylene terephthalate. In this embodiment the low density fraction is equal to or less than 1.1 g/cc and therefore includes polypropylene, high and low density polyethylene, and polystyrene. Specifically, The densities of plastic materials discussed herein are listed in the following Table I.

TABLE I

| Plastic | Density, g/cc |
|---------|---------------|
| HDPE | 0.955 g/cc (0.935–0.965) |
| LDPE | 0.920 g/cc (0.914–0.935) |
| PP | 0.900 g/cc (0.902–0.910) |
| PVC | 1.300 g/cc (1.250–1.360) |
| PET | 1.350 g/cc (1.320–1.390) |
| PS | 1.000 g/cc (0.980–1.100) |

One way of adjusting the air flow in the column 22 is to provide a calibrating sample of known plastic materials of similar size particles and having contrasting colors such as orange colored HDPE and green colored PVC. This known calibration sample is supplied from a calibrating source 40 through a line 42, the valve 23 and the feed stream line 20 to the column 22. An operator would visually observe the flow of the calibrating sample in the column 22 and adjust the control valve 36 to cause the orange HDPE particles to flow upwardly and the green PVC particles to fall downwardly in the column 22. At this stage the column 22 and air flow therein would be calibrated to provide a desired fractional split. Calibration could be carried out initially, intermittently and/or continuously with the colored known particles acting as tracers in the column 22 during the separation process. Further, the calibrating sample may include any number of plastic materials, each having its own distinctive color. The control valve 36 is adjusted to provide a desired density break as discussed above.

The light fraction output at the upper end of the column 22 may be sent to another column 44 via a valve 46, a line 48 and a column input line 50. In this instance, a valve 52 would be adjusted to control air flow at the lower input end of the column 44 such that the high density fractional break would occur at a lower density value. A different high density fraction would fall downwardly through a funnel-like output 54 and a line 55 for further handling, and a new low density fraction including for example HDPE and/or LDPE would rise and exit at the upper end of the column 44 via a line 56. This light end fraction could then be fed through a valve 59 to yet another column 58 operating in a similar manner as columns 22 and 44 for further treatment either at the same fractional break or at a new break level.

Also in like manner, the high density fractional output of columns 22 and 44 can be sent to another column 60 operating similarity to columns 22 and 44 to further separate the high density fractions either at the same fractional break or at a new break level.

In accordance with another aspect of the present invention, separation of a mixture of plastic material including PVC and PET can be further enhanced by selectively charging the plastic particles prior to feeding them to the column. Specifically, means 66 are between the valve 21 and the line 20 feeding the column 22 for inducing an electrostatic charge on the particles of the plastic mixture being feed to the column 22. A charge source 68 is provided for charging the surface of the column 22 to a polarity opposite to the polarity of the plastic material sort to be attracted thereto. The particle charging means 66 may be any device for causing particle motion or particles rubbed together such as mechanical means of fluidization or agitation. For example, a device such as a cyclone or mechanical agitator may be used to generate the electrostatic charge. The device 66 may also be an electrical generator such as a corona discharge. Alternatively, the charging may occur without a device 60 by taking place in the columns by the fluidized action of the plastic particles.

In one embodiment of the present invention, the feed of plastic is essentially composed of PVC having a density in the order of 1.3 g/cc (1.25–1.36 g/cc) and HDPE having a density of about 0.955 g/cc which is feed though the grinder 10 and the separator 14. The intermediate level output having a particle size range of from about 0.20 inches to about 0.30 inches is then sent to the particle charging device 66 which applies electrostatic charges to the plastic particles in the charge mix, or the charge may be generated by the particles rubbing together while traveling in the lines to the column. The charge on the PVC will be about $-12,639 \times 10^{-10}$ coulombs/cc, while the HDPE will have a charge of about $-1,908 \times 10^{-10}$ coulombs/cc. This plastic mix is fed by the line 20 to the column 22 with the column having been calibrated by feeding a calibration mixture of PVC and HDPE to the column from the calibration source 40 and adjusting the flow rate by valve 36 to provide for the HDPE to pass upwardly through the upper end of the column 22 and the PVC to fall downwardly and exhaust out the exit and 36 of the column 22. The column 22 has a positive charge applied thereto by the charge source 68 such that PVC particles entrained in the HDPE stream moving upwardly in the column 22 are attracted to the inner surface of the column 22. Also, in one embodiment where the column is plexiglass the flow of the particles acts to charge the column positively.

The PVC particles adhering to the inner surface of the column 22 may be removed by one of several methods. One method would be to have a collar 70 positioned within and abutting the inner surface of the column 22 with a vertical driving arm 72. A motor 74 periodically drives the arm 72 to run the collar 70 down the inner surface of the column 22 to scrape the PVC particles off the wall and permit such removed particles to fall downwardly through to the outlet 37 of the column 22.

The particles of PVC also may be removed from the interior surface of the column 22 by turning off the valve 36 and the feed valve 21 such that no new feed is being feed to the column 22, and then reversing the charge on the column 22 by the charge source 68 from a positive voltage to a negative voltage to repel the negatively charged PVC particles from the inner surface. The repelled PVC particles fall by gravity to the lower end of the column 22 and out through the funnel like bottom 37. A variation of this method would be to remove the charge applied by the source 68 to the column 22 such that the applied voltage is effectively zero.

In another embodiment, the inner surface of the column 22 may be cleared of PVC by initially turning off the valve 21 to stop the feed to the column 22, and changing the valve 46 such that the PVC is fed by line 74 to PVC exhaust line 38. The valve 36 is then opened further to increase the air fed by the line 34 to the column 22 to a level sufficient to cause PVC particles to exhaust upwardly through the column 22. The polarity of the charge applied by the charge source 68 to the column 22 is then reversed such that the surface of the column 22 is negative to repel the negatively charged PVC particles therefrom. The repelled PVC particles then exhaust upwardly under the increased pressure of the air flow in the column 22 out through the valve 46, the line 64 to the PVC exhaust line 38.

As discussed above, PVC and PET have overlapping densities in that PVC has a density in the range of 1.25 to 1.36 g/cc and PET has a density in the range of 1.32 to 1.39 g/cc. Separation of such a mixture of PVC and PET can be obtained by selectively charging the plastic particles prior to feeding them to the column 60. Specifically, means 78 are located before a valve 83 in a line 82 feeding the column 60 for inducing an electrostatic charge on the PVC and PET particles being feed to the column 60. A charge source 80 is provided for charging the surface of the column 60 to a polarity opposite to the polarity of the PVC. As described in U.S. Pat. No. 5,118,407, PET may be charged positively and PVC negatively charged, In this instance the column would be charged positively. The PVC is attracted to the column while the PET exits the top of the column 80 by a line 84.

The PVC is removed from the interior surface of the column 60 by any one of the methods described above with reference to column 22, including wiping the interior surface with a collar driven by a motor 88.

EXAMPLE 1

In Example 1, a mixture of resins was prepared by blending 75% unpigmented, ground HDPE milk bottles with 25% pigmented, ground PVC recycle resin. The two samples had different particle size distributions as shown in the following Table II.

TABLE II

| Particle Size (mm) | PVC (wt %) | HDPE (wt %) |
| --- | --- | --- |
| >2.0 | 0.05 | 3.9 |
| 1–2 | 16.85 | 56.4 |
| 0.706–1.000 | 40.20 | 32.5 |
| 0.590–0.706 | 12.60 | 1.3 |
| 0.355–0.590 | 27.93 | 4.68 |
| <0.355 | 2.53 | 1.22 |

100 grams of the mixture was placed in a fluidized bed column and the fluidizing air stream was turned on until 0.66 grams was blown from the bed and collected. The fluidizing velocity was increased, and a second cut was collected consisting of 0.325 grams. Eleven additional cuts were collected, each containing an average of 4.9 grams. A total of 54.92 grams was removed in these twelve cuts. The PVC content of the last four was determined. It was observed that the PVC consisted of much smaller particles than the HDPE in each cut that was blown from the bed. Each of these four samples was classified through a stack of screens. In this way the smaller PVC particles separate from the HDPE. The resin remaining in the column contained 68.4% of the original PVC resin at 37.9% concentration. The last four cuts were analyzed with the results shown in the following Table III.

TABLE III

| Sample | Weight (g) | PVC (%) | >0.706 mm (% PVC) | <0.706 mm (% PVC) |
| --- | --- | --- | --- | --- |
| 10 | 3.307 | 9.90 | 0.65 | 40.6 |
| 11 | 7.721 | 12.40 | 0.30 | 60.6 |
| 12 | 12.735 | 13.65 | 0.50 | 72.5 |
| 13 | 8.190 | 9.50 | 0.80 | 80.7 |

The above example shows that fluidization alone will not provide sufficient separation of PVC and HDPE resin when they are of different particle size distributions.

EXAMPLE 2

Ground samples of HDPE milk bottle resin and recycled PVC were sized classified by screening to obtain samples of similar size in the range of between 0.706 mm and 0.590 mm cuts of each. One sample was prepared from these cuts combining 10% PVC and 90% HDPE. The sample was continuously injected into the side of a fluidized bed column with the air rate such that some resin was continuously blown out the top to be collected. At the conclusion of test, 96.2% of the original HDPE fed was recovered overhead at a purity of 99.3%. The resin remaining in the bottom of the column contained 93.6% of the PVC fed at a purity of 87%.

EXAMPLE 3

A second sample of 20% PVC was prepared as in the last example and similarly injected and separated but at a slightly greater air rate. The resin collected overhead contained 99.6% of the HDPE fed at 95% purity. The bottoms contained 79% of the PVC fed at 98.4% purity.

Examples 2 and 3 show that size classification and fluidization can be combined to separate plastics having a density difference as illustrated by HDPE (0.955 g/cc) and PVC (1.3 g/cc). Further, fluidizations can be conducted in a single pass or in a train.

In another embodiment, an electrostatic charge is induced on the ground particles of plastic materials in the mixture. The particle motion causing the charge build up can be generated via mechanical means such as fluidization, and/or agitation. Other devices for generating a charge build up are a cyclone or mechanical agitators. The separation takes place as highly electrostatically charged particles settle on the interior surface holding an opposite charge. This process was demonstrated in a fluidization column where HDPE and PVC were separated.

In another example screening and fluidizing a mixture of HDPE and PVC was used to separate these two materials. It was observed that PVC collects a negative charge due to its highly electronegative chlorine atoms present in the chains and generates an opposite charge on the walls of a plexiglass fluidization column. Although both PVC and HDPE held a negative charge, PVC had about six times the charge of HDPE per unit volume. Thus, in this embodiment the plastics to be separated are charged to the same polarity, i.e. negative, while the column is charged to the opposite polarity, i.e. positive.

EXAMPLES 4–9

Experimental data was collected from a 3.5" plexiglass fluidization column having a height of 80.25", and having an air supply of 100 psi. The material consisted of thin wall PVC and HDPE bottles. Both PVC and HDPE bottles were ground in a NELMOR RG1012M1 Granulator and sent through a ¼" screen. Several blends of 500 g mixture of the two materials were made with 15% and 20% PVC. Each blend was carefully introduced to the column and tested.

Separation using several air velocities were investigated, with conditions of the column at atmospheric pressure and temperature. Table IV shows the results for a 15% PVC blend.

TABLE IV

| | Separation by Fluidization at Different Air Velocities | | | | |
| --- | --- | --- | --- | --- | --- |
| | INITIAL | | | RECOVERY | |
| EXAMPLE NUMBER | LOAD, 500 G TOTAL | MATERIAL BLOWN OUT | AIR VELOCITY | % INITIAL HDPE | HDPE PURITY, % |
| 4 | 15% PVC | HDPE | 3.04 m/s | 29.41% | 99.99% |
| 5 | 15% PVC | HDPE | 3.42 m/s | 47.06% | 99.75% |
| 6 | 15% PVC | HDPE | 3.80 m/s | 68.26% | 99.28% |
| 7 | 15% PVC | HDPE | 4.18 m/s | 75.29% | 98.16% |
| 8 | 15% PVC | HDPE | 4.56 m/s | 80.85% | 97.01% |

The experiments confirm that good separation may be obtained by fluidization alone, and that the electrostatic attractive forces between the PVC particles and the walls of the plexiglass column greatly enhanced the separation. Note from the following Table V the high purity of the PVC retrieved from the column walls due to a significant positive charge build up on the plexiglass surface.

TABLE V

| | Electrostatic Separation of PVC PVC Retrieved from Column Walls | | | | |
| --- | --- | --- | --- | --- | --- |
| | INITIAL | | | RECOVERY | |
| EXAMPLE NUMBER | LOAD, 500 G TOTAL | MATERIAL ON WALL | AIR VELOCITY | % INITIAL PVC | PVC PURITY, % |
| 6 | 15% PVC | PVC | 3.80 m/s | 45.07% | 97.41% |
| 7 | 15% PVC | PVC | 4.18 m/s | 20.00% | 96.77% |
| 9 | 20% PVC | PVC | 3.80 m/s | 30.00% | 97.40% |

Also note from Table IV that HDPE purity decreases as the air rate increases. Thus, both the air flow rate and the surface charge on the column should be adjustable and controllable, as described hereinabove with reference to the Figure.

Both ground resins were tested for electrostatic charge density after prolonged agitation: HDPE $-1.908 \times 10^{-10}$ Coulombs/cc, PVC $-12.639 \times 10^{-10}$ Coulombs/cc. The electrostatic charges can also be induced by electrostatic charge generation. Charged drums, plates, screens, and columns will also be effective in attracting and separating PVC from HDPE.

Although the columns in the Figure are cylindrical, they may have any desired cross-sectional shape, for example elliptical, square, rectangular, etc. Further, the plastic particles are movable between the various components in the Figure by any combination of blowers, pumps, screw or belt conveyors, gravity, and the like as is well known in the art.

While the invention has been described in conjunction with specific embodiments thereof, it is evident that many alternatives, modifications, and variations will be apparent to those skilled in the art in light of the foregoing description. According, it is intended to embrace all such alternatives, modification, and variations as fall within the spirit and broad scope of the appended claims.

What is claimed is:

1. A method of separating a mixture of at least two different plastic materials comprising the steps of:
   providing said mixture in the form of particles, inducing electrostatic charges on the particles of said mixture; and then introducing said mixture in the form of charged particles into a vertical fluidized bed column having an upwardly flowing gaseous stream therein;
   after said inducing, introducing additional particles of plastic into the fluidized bed;
   maintaining the flow rate of said gaseous stream to provide a relatively low density fraction of said mixture, including a first plastic, exiting at the upper end of said column and a relatively high density fraction of said mixture, including a second plastic, exiting at the lower end of said column;
   and charging said column with a polarity opposite that of the charge on said second plastic for attracting thereto the particles of said second plastic which are of relatively high density and having the highest electrostatic charge relative to said first plastic of a relatively low density.

2. The method of claim 1 comprising comminuting said plastic mixture into particles having a size equal to or less than 1.0 inch.

3. The method of claim 2 wherein said comminuted particles have a size less than about 0.3 inch.

4. The method of claim 1 wherein said particles of plastic are of a size in the range of from about 0.2 inch to about 0.3 inch.

5. The method of claim 2 wherein said low density fraction is equal to or less than 1.1 g/cc, and said high density fraction is greater than 1.1 g/cc.

6. The method of claim 5 wherein said low density fraction includes at least one of high density polyethylene, low density polyethylene, polypropylene or polystyrene.

7. The method of claim 5 wherein said high density fraction includes at least one of polyvinylchloride or polyethylene terephthalate.

8. The method of claim 5 wherein said low density fraction consists essentially of polyethylene, and said high density fraction consists essentially of polyvinylchloride.

9. The method of claim 8 wherein said low density fraction consists essentially of high density polyethylene.

10. The method of claim 1 further comprising introducing said low density fraction or said high density fraction into a second vertical fluidized bed column having an upwardly flowing gaseous stream therein; and maintaining the flow rate of the gaseous stream in said second column to provide another relatively low density fraction exiting at the upper end of said second column and another relatively high density fraction exiting at the lower end of said second column.

11. The method of claim 1 further comprising the steps of feeding a calibrating sample of known plastic materials of similar size and distinctive colors to said column, and adjusting the flow rate of said gaseous stream to obtain a predetermined fractional split between said low density fraction and said high density fraction by observing the flow of said known plastic materials in said column.

12. The method of claim 1 further comprising reversing the polarity of the charge on said column to repel the plastic particles attracted thereto and thereby permit the repelled plastic particles to exit at the lower end of the said column.

13. The method of claim 1 further comprising periodically sweeping the interior surfaces of said column to remove the plastic particles attracted thereto.

* * * * *